Jan. 12, 1965   J. H. ENRIGHT   3,165,271
GARBAGE DISPOSER UNITS
Filed April 19, 1962   3 Sheets-Sheet 2

INVENTOR.
JAMES H. ENRIGHT

Jan. 12, 1965   J. H. ENRIGHT   3,165,271
GARBAGE DISPOSER UNITS
Filed April 19, 1962   3 Sheets-Sheet 3
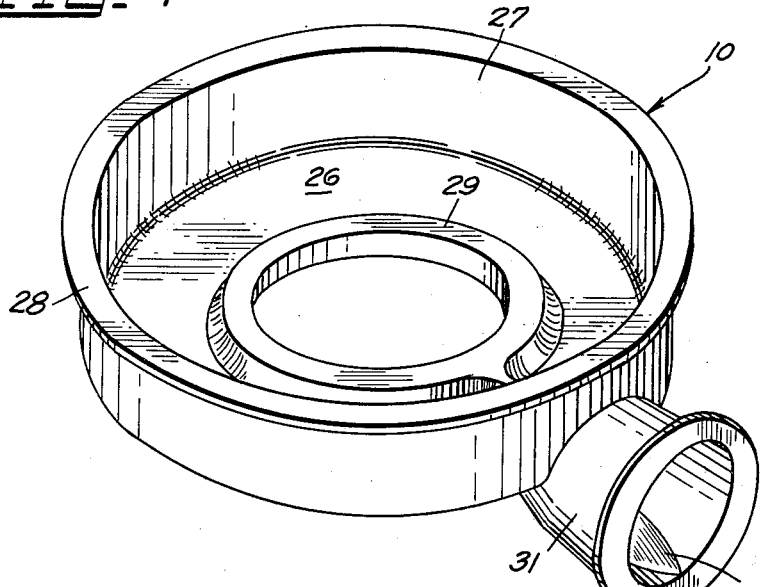
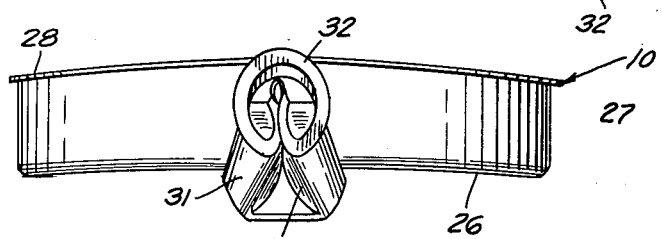
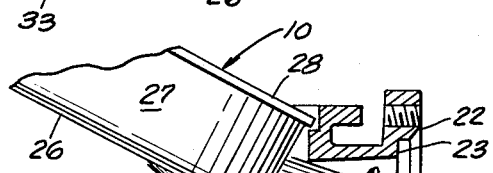
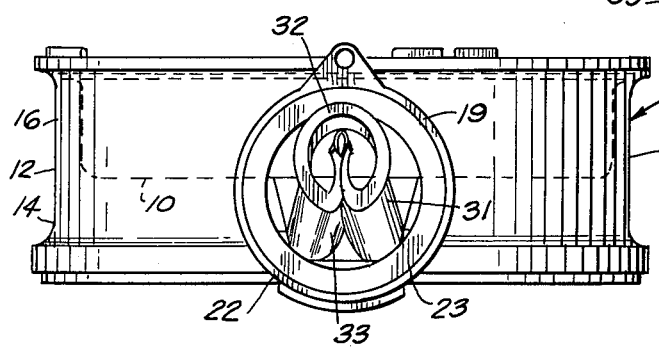
INVENTOR.
JAMES H. ENRIGHT
BY Charles B. Cannon
HIS ATT'Y.

3,165,271
GARBAGE DISPOSER UNITS
James H. Enright, Racine, Wis., assignor to In-Sink-Erator Manufacturing Company, Racine, Wis., a corporation of Wisconsin
Filed Apr. 19, 1962, Ser. No. 188,693
11 Claims. (Cl. 241—300)

This invention relates to garbage disposer units, and more particularly, to waste receptacles and end bells which are particularly well adapted for use in garbage disposer units, and the like.

It is a primary object of the present inventon to enable the waste discharging portion of a garbage disposer, or the like, to be protected in a novel and effective manner from the corrosive effects of detergents, and the like, passing therethrough.

Another object is to afford a novel waste receptacle.

A further object is to enable a novel combination waste receptacle and end bell unit to be afforded.

Various attempts have heretofore been made in the art to protect waste receptacles, such as, for example, the waste receptacles through which garbage and other waste passes in a garbage disposer unit, from the corrosive effect of the material passing therethrough. However, the attempts which have been heretofore made to so protect such waste receptacles have had several inherent disadvantages, such as, for example, requiring expensive manufacturing procedures; not affording effective protection against corrosion; not affording a unit which was efficient and effective in operation; affording a unit which was large and cumbersome in size; not affording a unit which could be readily assembled in a garbage disposer, or the like; or not affording a unit which could be readily and economically produced commercially, and the like. It is an important object of the present invention to overcome such disadvantages.

Another object is to afford a novel waste receptacle of the aforementioned type wherein a metal casing, forming the main body portion thereof, is effectively protected by a protective lining in a novel and expeditious manner.

Another object is to afford a novel waste receptacle of the aforementioned type embodying a cast metal housing and a pre-molded plastic liner constituted and arranged in a novel and expeditious manner.

Yet another object is to afford a novel combination waste receptacle and end bell unit of the aforementioned type, wherein the parts thereof are so constituted and arranged that one portion thereof affords a protectively lined waste receptacle adapted to receive and discharge waste material from the comminuting chamber of a garbage disposed unit, and another part affords an effective upper end bell for a motor housing of such a garbage disposer.

A further object of the present invention is to afford a novel waste receptacle of the aforementioned type embodying a lining which is so constructed, and is so constituted and arranged, as to effectively direct and control the passage of waste material through the receptacle.

Another object is to afford a novel waste receptacle of the aforementioned type wherein the receptacle is effectively protected against the corrosive action of materials passing therethrough throughout the passage of material through the receptacle.

Yet another object is to enable a novel metal casting and novel molded plastic liner to be assembled in a novel and expeditious manner to afford a novel waste receptacle of the aforementioned type.

A further object of the present invention is to afford a novel method of manufacturing a novel waste receptacle of the aforementioned type.

Another object is to afford a novel combination waste receptacle and end bell which is practical and efficient in operation and construction, and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 4 is a top perspective view of the liner embodied in the combination waste receptacle and end bell unit shown in FIG. 2;

FIG. 5 is a side elevational view of the liner shown in FIG. 4; with certain parts thereof disposed in different position;

FIG. 6 is a fragmentary sectional view of the combination waste receptacle and end bell unit shown in FIG. 2, with the liner thereof shown in one of the positions which it occupies during the insertion of the liner into the outer housing of the unit; and FIG. 7 is a side elevational view similar to FIG. 3, but showing a portion of the liner disposed in different position.

Figure 1:
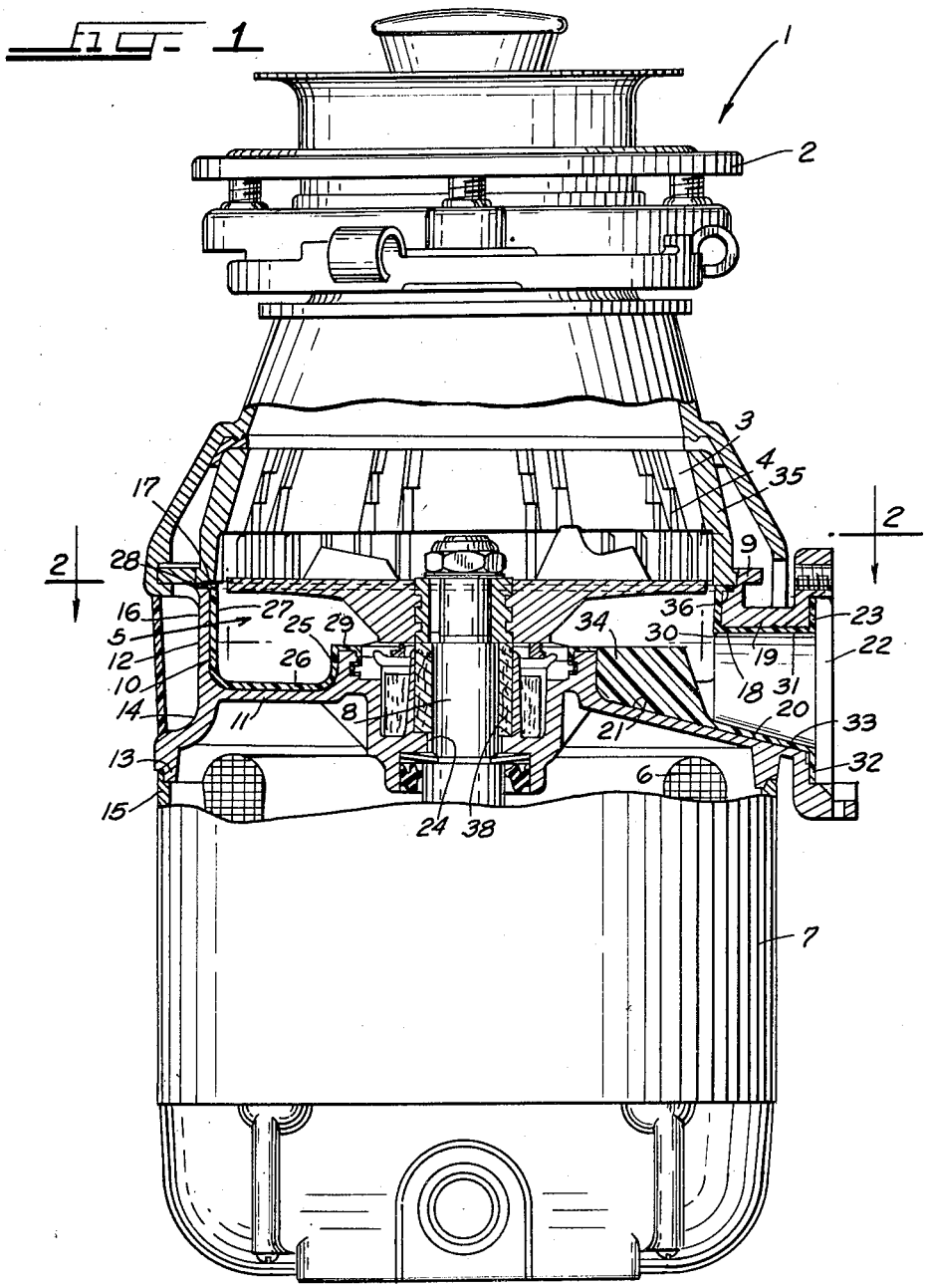
FIG. 1 is a side elevational view of a garbage disposer unit embodying the principles of the present invention, with certain parts broken away to show underlying parts.

A garbage disposer unit 1, embodying the principles of the present invention, is shown in the drawings to illustrate the preferred embodiment of the present invention.

The garbage disposer unit 1 embodies, in general, an upper inlet end 2 disposed above a comminuting chamber 3. Grinding or comminuting mechanism 4 is disposed in the comminuting chamber 3, and a combination waste receptacle and end bell unit 5 is disposed below the comminuting chamber 3 in position to receive garbage and other waste material passing through the comminuting mechanism 4 in the operation of the garbage disposer 1. A motor 6 is mounted in a motor housing 7 below the combination waste receptacle and end bell unit 5, and includes a drive shaft 8, which extends upwardly through the waste receptacle and end bell unit 5 and is operatively connected to the comminuting mechanism 4 for operating the latter upon energization of the motor 6.

As may be seen in FIG. 1, the combination waste receptacle and end bell unit 5 not only affords a waste receptacle for receiving waste material from the comminuting chamber 3, but also affords an upper end bell for the motor housing 7.

Figure 2:
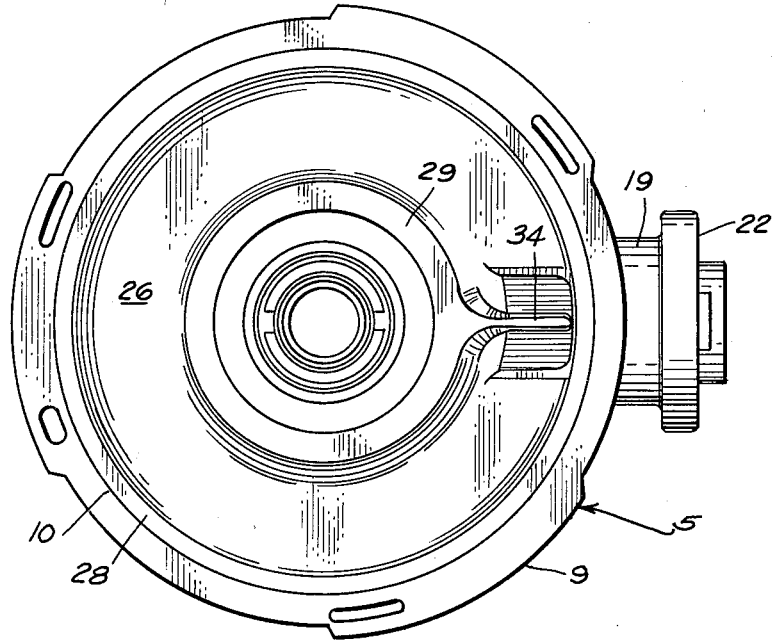
FIG. 2 is a top plan view, looking in the direction of the arrows 2—2 in FIG. 1, of the combination waste receptacle and end bell unit embodied in the garbage disposer shown in FIG. 1.
Figure 3:
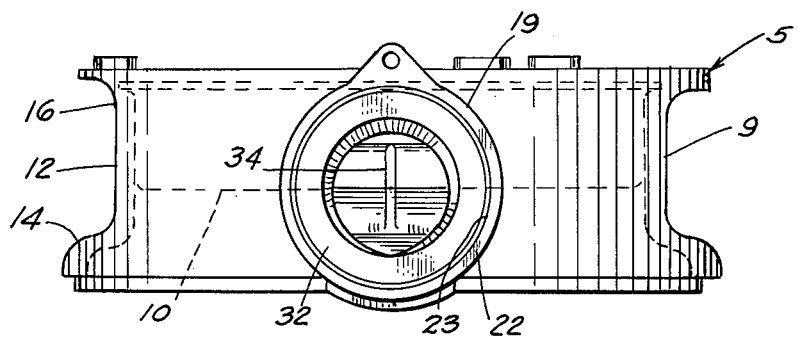
FIG. 3 is a side elevational view of the combination waste receptacle and end bell unit shown in FIG. 2.

The combination waste receptacle and end bell unit 5, FIGS. 1, 2, and 3, includes a preferably substantially rigid outer housing 9 made of suitable material, such as, for example, die cast aluminum, and an inner liner 10 made of suitable plastic material, such as, for example, polypropylene. The housing 9 includes a substantially round, generally horizontally extending wall 11 and an endless side wall 12, which projects upwardly and downwardly from the outer peripheral edge portion of the wall 11, FIG. 1. The lower end 13 of the lower end portion 14 of the side wall 12 is rabbeted at its outer peripheral edge portion to receive the complementary shaped upper end 15 of the motor housing 7, FIG. 1. The upper end of the upper end portion 16 of the side wall 12 is recessed to afford an upwardly facing shoulder 17 at the inner peripheral edge thereof, FIG. 1, for a purpose which will be discussed in greater detail presently.

A substantially round outlet opening 18 is formed in the upper end portion 16 of the side wall 12 above, and immediately adjacent the wall 11, FIG. 1, and an elongated, tubular discharge nozzle 19 projects radially outwardly from the side wall 12 in direct communication with the opening 18, the opening 18 and the nozzle 19 being disposed substantially in axial alignment with each other. The bottom wall 20 of the nozzle 19 slopes downwardly and outwardly from the opening 18, and the portion 21 of the wall 11 of the housing 9 adjacent to the opening 18 also slopes downwardly and outwardly, in substantially uniplanar relation to the bottom wall 20 of the nozzle 19. The free end portion 22 of the nozzle 19 is of larger diameter than the remainder of the nozzle 19, to thereby afford a shoulder 23, which faces outwardly away from the side wall 12 of the housing 9.

The wall 11 of the housing 9 has an opening 24 extending vertically through the radial central portion thereof, the drive shaft 8 of the motor 6 being journalled therein when the combination waste receptacle and end bell unit 5 is mounted in operative position in the garbage disposer 1, as shown in FIG. 1. The wall 11 also includes an annular rib 25 projecting upwardly in substantially parallel spaced relation to the upper end portion 16 of the side wall 12, the rib 25 being substantially shorter in height than the upper end portion 16 of the side wall 12.

The liner 10, FIGS. 1 and 4, includes an annular bottom wall 26, and an endless side wall 27 projecting upwardly from the outer peripheral edge portion of the bottom wall 26. The side wall 27 terminates at its upper edge portion in a radially outwardly projecting flange 28, which is disposed in such position that when the liner 10 is disposed in operative position in the housing 9, the flange 28 of the liner 10 rests on the shoulder 17 of the housing 9, as shown in FIG. 1. The inner peripheral edge portion of the bottom wall 26 of the liner 10 terminates in a raised annular rib 29, which is of downwardly opening channel-shaped transverse cross-section. The rib 29 is of such transverse cross-sectional size as to receive the rib 25 of the wall 11 of the housing 9 therein with a relatively snug fit when the liner 10 is disposed in operative position in the housing 9, as shown in FIG. 1.

The side wall 27 of the liner 10 has a substantially round discharge opening 30 extending through one side wall portion thereof, FIG. 1. An elongated, tubular-shaped nozzle 31 projects outwardly from the discharge opening 30 in axial alignment therewith. The main body portion of the nozzle 31 is complementary in size and shape to the portion of the nozzle 19 disposed inwardly of the shoulder 23, and, when the liner 10 is disposed in operative position in the housing 9, the main body portion of the nozzle 31 is disposed in close fitting juxtaposition to the internal surface of that portion of the nozzle 19 disposed inwardly of the shoulder 23. The outer end portion of the nozzle 31 terminates in a radially outwardly projecting flange 32 which is of such size and shape that when the nozzle 31 is disposed in operative position in the nozzle 19, the flange 32 is disposed in the enlarged free end portion 22 thereof in engagement with the shoulder 23, FIG. 1.

The lower wall 33 of the nozzle 31 is disposed in parallel juxtaposition to the lower wall 20 of the nozzle 19, and the immediately adjacent portion of the bottom wall 26 of the liner 10 slopes downwardly and outwardly in uniplanar relation to the bottom wall 33 of the nozzle 31. A substantially straight elongated rib 34, FIGS. 1 and 2, projects upwardly from the bottom wall 26 of the liner 10, directly inwardly of the radial center of the opening 30. The rib 34 is of the same height as the rib 29 and projects radially outwardly therefrom, terminating at its outer end in closely adjacent, inwardly spaced relation to the opening 30.

The upper end of the upper end portion 16 of the side wall 12 of the housing 9 is of such size and shape that in the assembled garbage disposer 1, the lower end portion of the wall 35, which constitutes the outer wall of the comminuting chamber 3, is disposed in the end portion 16 with a relatively snug sliding fit, with the lower end 36 of the wall portion 35 resting on top of the flange 28 of the liner 10, FIG. 1.

In the assembled garbage disposer 1, the drive shaft 8 of the motor 6 may be sealed into the opening 24 in the wall 11 of the housing 9 against leakage liquid therebetween by suitable sealing and journalling means such as the sealing and bearing material 38 shown in FIG. 1.

It will be seen that with the combination waste receptacle and end bell 5 constructed in the aforementioned manner, when it is disposed in operative position in the garbage disposer 1, the upper end portion thereof affords a practical and efficient waste receptacle for receiving comminuted garbage and other waste material from the comminuting chamber 3, with all of the metallic parts of the waste receptacle being effectively protected by the liner 10 against the corrosive effect of material passing therethrough. Also, it will be seen that at the same time the lower end portion of the unit 5 affords a practical and efficient upper end bell for the motor housing 7.

In the operation of the garbage disposer 1, the waste material passing therethrough passes downwardly through the comminuting chamber 3 into the upper end portion of the combination waste receptacle and end bell unit 5 and outwardly through the nozzle 19 into a suitable drain pipe, or the like, not shown, which may be connected into the free end portion 22 of the nozzle 19 in abutting relation to the outer face of the flange 32 on the nozzle 31 of the plastic liner 10. It will be seen that the side wall 27 and the annular rib 29 of the liner 10 define the lateral sides of an upwardly opening, annular trough. As will be appreciated by those skilled in the art, the action of the comminuting mechanism 4 on the waste material is caused to swirl around the drive shaft 8 in the upper end portion of the combination waste receptacle and end bell unit 5. The rib 34 on the liner 10 is disposed in such position that it is effective to deflect and direct the waste material swirling around in the bottom of the annular trough defined by the side wall 27, the bottom wall 26 and the annular rib 29 of the plastic liner 10, outwardly through the nozzle 19.

In the construction or manufacture of the novel combination waste receptacle and end bell unit 5, the housing 9 and the liner 10 may be separately cast and molded, respectively. The housing 9 is preferably a die casting of aluminum, but as will be appreciated by those skilled in the art, may be otherwise formed of other suitable materials. The liner 10 is molded of a suitable plastic material, and preferably is molded of a suitable plastic material such as, for example, polypropylene, which is self supporting and relatively hard and non-flexible at room temperature, but becomes soft and pliable when heated to a higher temperature, such as, for example, a temperature between 150° F. and 200° F.

The wall thickness of the liner 10 is preferably in the order of one-sixteenth of an inch. Therefore, when the liner 10 is disposed in its normal shape and configuration, as shown in FIGS. 1 and 4, it would not be insertable into, and removable from the housing 9, the flange 32, among other things, preventing the nozzle 31 of the liner 10 from being inserted into or removed from the nozzle 19. However, polypropylene, when heated to somewhat less than 200° F., becomes relatively soft and pliable. Therefore, in the construction of the unit 5, the liner 10, after it has been molded, may be heated in a water bath to a temperature of 200° F. and the bottom wall 20 of the nozzle 31 may then be folded upwardly into the nozzle 31 to thereby reduce the outside diameter thereof, as shown in FIGS. 5, 6, and 7. With the nozzle 31 so shaped, the liner 10 may be inserted into the housing 9, the nozzle 31 first being inserted into the nozzle 19, as shown in FIG. 6, and the liner 10 then being pressed downwardly into position in the housing 9, as shown in FIG. 7. Thereafter, while the nozzle 31 is still soft and flexible, the bottom wall 20 thereof may be unfolded into its normal position, to thereby dispose the liner 10 in its normal operative position in the housing 9, as shown in FIGS. 1, 2, and 3. After the liner 10 has cooled to a temperature below its softening temperature, it becomes effectively secured in operative position in the housing 9, as previously discussed.

The folding of the bottom wall 33 upwardly into the nozzle 31 from the position shown in FIG. 4 to the position shown in FIG. 5 may be accomplished in any suitable manner, such as, for example, by the use of suitably shaped pliers, or the like. Similarly, the unfolding of the bottom wall 33 of the nozzle 31 from the position shown in FIG. 7 to the position shown in FIG. 3 may be accomplished in any suitable manner, such as, for example, by inserting into the nozzle 31 a suitably shaped probe or spade.

From the foregoing, it will be seen that the present invention affords a novel combination waste receptacle and end bell unit, and a novel method of manufacturing such a unit.

Also, it will be seen that the novel waste receptacle afforded by the present invention is effectively lined for protection against corrosion.

In addition, it will be seen that the present invention affords a novel and practical lining of plastic material which may have a relatively thick wall construction.

Also, it will be seen that the present invention affords a novel and practical combination waste receptacle and end bell unit which is practical and efficient in operation and may be readily and economically produced commercially.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a garbage disposer unit, a waste receptacle comprising
    (a) a housing having
        (1) an endless vertically extending upstanding side wall having
            (a') a discharge opening extending substantially radially therethrough, and
    (b) a plastic liner
        (1) mounted in said housing in linking relationship thereto and
        (2) having a discharge nozzle disposed in said opening.

2. In a garbage disposer unit, a waste receptacle comprising
    (a) a cast metal housing having
        (1) a discharge opening extending through one portion thereof, and
    (b) a molded plastic liner
        (1) mounted in said housing in lining relation thereto, and having
        (2) a discharge nozzle disposed in said opening.

3. In a garbage disposer unit, a waste receptacle comprising
    (a) a cast metal housing having
        (1) an endless upstanding side wall having
            (a') a discharge opening extending through one portion thereof, and
        (2) a discharge nozzle
            (a') projecting outwardly from said side wall
            (b') in communication with said opening, and
    (b) a molded plastic liner
        (1) mounted in said housing in lining relation thereto, and having
        (2) another discharge nozzle
            (a') disposed in said opening and said first-mentioned discharge nozzle
            (b') in lining relation to said opening and said first-mentioned discharge nozzle.

4. In a garbage disposer unit, a waste receptacle comprising
    (a) a cast metal housing having
        (1) an endless upstanding side wall having
            (a') a discharge opening extending through one portion thereof, and
        (2) an elongated discharge nozzle
            (a') projecting outwardly from said side wall
            (b') in communication with said opening,
    (b) said nozzle having an enlarged free end portion, and
    (c) a pre-molded plastic liner having
        (1) another elongated discharge nozzle having
            (a') a free end portion with
            (b') a radially outwardly projecting flange on said free end portion,
    (d) said liner
        (1) being disposed in lining relation to said housing with
        (2) said other discharge nozzle
            (a') being disposed in lining relation to said opening and to said first-mentioned discharge nozzle with
            (b') said flange disposed in said enlarged end portion.

5. A combination waste receptacle and end bell comprising
    (a) a metal housing comprising
        (1) a substantially round horizontally extending wall,
        (2) an endless side wall
            (a') projecting upwardly and downwardly from the outer periphery of said horizontally extending wall,
            (b') said side wall having a discharge opening extending substantially radially through one portion thereof above said horizontally extending wall, and
        (3) an elongated tubular discharge nozzle
            (a') projecting outwardly from said side wall
            (b') in substantially axial alignment with said opening, and
            (c') in direct communication with said opening, and
    (b) a plastic liner comprising
        (1) another substantially round horizontally extending wall
            (a') disposed in overlying juxtaposition to said first-mentioned horizontally extending wall,
        (2) another endless side wall
            (a') projecting upwardly from the outer periphery of said other horizontally extending wall, and
            (b') disposed in juxtaposition to the inner face of the upwardly projecting portion of said first-mentioned side wall,
            (c') said other side wall having another discharge opening extending substantially radially through one portion thereof above said other horizontally extending wall in axial alignment with said first-mentioned opening,
(3) another elongated tubular discharge nozzle
(a') projecting outwardly from said other side wall
(b') in substantially axial alignment with said other discharge opening, and
(c') in direct communication with said other opening,
(d') said other nozzle being disposed in lining relation to said first-mentioned opening and to said first-mentioned nozzle, and
(4) upwardly projecting means disposed inwardly of said other side wall in position to direct material moving around said other horizontally extending wall outwardly through said other opening.

6. A combination waste receptacle and end bell comprising
(a) a metal housing comprising
(1) a substantially round horizontally extending wall,
(2) an endless side wall
(a') projecting upwardly and downwardly from the outer periphery of said horizontally extending wall,
(b') said side wall having a discharge opening extending substantially radially through one portion thereof above said horizontally extending wall, and
(3) an elongated tubular discharge nozzle
(a') projecting outwardly from said side wall
(b') in substantially axial alignment with said opening, and
(c') in direct communication with said opening, and
(b) a plastic liner comprising
(1) another substantially round horizontally extending wall
(a') disposed in overlying juxtaposition to said first-mentioned horizontal extending wall,
(2) another endless side wall
(a') projecting upwardly from the outer periphery of said other horizontally extending wall, and
(b') disopsed in juxtaposition to the inner face of the upwardly projecting portion of said first-mentioned side wall,
(c') said other side wall having another discharge opening extending substantially radially through one portion thereof above said other horizontally extending wall in axial alignment with said first-mentioned opening,
(3) another elongated tubular discharge nozzle
(a') projecting outwardly from said other side wall
(b') in substantially axial alignment with said other discharge opening, and
(c') in direct communication with said other opening,
(d') said other nozzle being disposed in lining relation to said first-mentioned opening and to said first-mentioned nozzle,
(4) an annular rib
(a') projecting upwardly from said other horizontally extending wall
(b') in inwardly spaced substantially parallel relation to said other side wall,
(c') said annular rib projecting upwardly from said other horizontally extending wall a lesser distance than said other side wall, and
(5) an elongated, substantially straight raised rib
(a') projecting substantially radially outwardly from said annular rib
(b') in substantially axial alignment with said other opening,
(c') said raised rib terminating in inwardly spaced relation to said other side wall, and
(d') being of substantially the same height as said annular rib.

7. A combination waste receptacle and end bell as defined in claim 6, and in which said liner is composed of polypropylene.

8. A combination waste receptacle and end bell as defined in claim 6, and in which said housing includes an annular rib mounted in said first-mentioned annular rib.

9. A combination waste receptacle and end bell as defined in claim 6, and in which
(a) said first-mentioned nozzle has a free end portion of larger internal size than the adjacent portion of said nozzle,
(b) said other nozzle has a free end portion having a radially outwardly projecting flange thereon, and
(c) said flange is disposed in said first-mentioned free end portion.

10. A combination waste receptacle and end bell as defined in claim 9, and in which said housing includes an annular rib mounted in said first-mentioned annular rib.

11. In a garbage disposer unit having a comminuting chamber, means disposed in said chamber for comminuting garbage to be disposed of, a motor, having a housing, disposed below said means, and a drive shaft operatively connected to said motor and to said means for driving said means upon energization of said motor,
(a) a combination waste receptacle and motor end bell comprising
(1) a substantially round horizontally extending wall
(a') having an opening extending through the radial center thereof,
(2) an endless side wall
(a') projecting upwardly and downwardly from said horizontally extending wall, and
(b') having
(1') an opening extending through one portion thereof above said horizontally extending wall, and
(2') a radially inwardly projecting shoulder on the top thereof,
(3) an elongated tubular nozzle
(a') projecting outwardly from said opening in communication therewith, and
(b') having an enlarged free end portion,
(4) an annular rib
(a') extending around said first-mentioned opening and
(b') projecting upwardly from said horizontally extending wall, and
(5) a pre-molded plastic liner having
(a') an annular-shaped bottom wall,
(b') another annular rib
(1') of downwardly - opening channel-shaped transverse cross-section
(2') projecting upwardly from the inner peripheral edge of said bottom wall,
(c') another endless side wall
(1') projecting upwardly from the outer peripheral edge of said bottom wall and
(2') having
(a'') another opening extending through a portion thereof, and
(b'') a radially outwardly projecting flange on the top of said other side wall, (d') another elongated tubular nozzle
- (1') projecting outwardly from said other opening
- (2') in axial alignment with said other opening and
- (3') in communication therewith, and
- (4') having a free end portion
  - (a") having a radially outwardly projecting flange thereon, and
(e') a substantially straight elongated rib
- (1') projecting radially outwardly from said other rib in axial alignment with said other opening and
- (2') terminating inwardly of said other side wall, (b) said liner being disposed in position wherein
- (1) said bottom wall is disposed in overlying juxtaposition to said horizontally extending wall,
- (2) said first-mentioned annular rib is disposed in the channel-shaped portion of said other annular rib,
- (3) said other side wall is disposed in juxtaposition to said first-mentioned side wall with
  - (a') said flange on said other side wall disposed on said shoulder, and
- (4) said other nozzle is disposed in said first-mentioned opening and said first-mentioned nozzle in lining relation thereto with
  - (a') said flange on said other nozzle disposed in said free end portion, (c) said combination waste receptacle and motor end bell being disposed around said shaft between said comminuting chamber and said motor housing in position to
- (1) close the upper end of said housing,
- (2) afford a bottom for said comminuting chamber, and
- (3) receive comminuted garbage from said comminuting means, (d) said other annular rib and said elongated rib
- (1) being substantially the same height, and
- (2) being shorter than said other side wall, and (e) said other annular rib and said other side wall defining the lateral sides of an annular-shaped trough through which comminuted garbage may pass into engagement with said elongated rib for deflection outwardly through said other opening and said other nozzle.

References Cited by the Examiner
UNITED STATES PATENTS

| | | | |
|---|---|---|---|
| 1,956,462 | 4/34 | Knuth | 29—529 |
| 2,782,997 | 2/57 | Wolff | 241—46 |
| 2,868,465 | 1/59 | Wieczorek | 241—285 |
| 2,951,650 | 9/60 | Gould. | |
| 2,965,318 | 12/60 | Jordan | 241—46 |
| 3,028,667 | 4/62 | Wintermute et al. | 29—529 |
| 3,094,291 | 6/63 | Lindstrom et al. | 241—285 |

J. SPENCER OVERHOLSER, *Primary Examiner.*
ROBERT A. O'LEARY, *Examiner.*